United States Patent
Du et al.

(10) Patent No.: US 11,505,128 B2
(45) Date of Patent: Nov. 22, 2022

(54) FOOT STEP FOR VEHICLE AND VEHICLE

(71) Applicant: T-MAX (HANGZHOU) TECHNOLOGY CO., LTD., Hangzhou (CN)

(72) Inventors: Xinfa Du, Hangzhou (CN); Yiming Wang, Hangzhou (CN)

(73) Assignee: T-MAX (HANGZHOU) TECHNOLOGY CO. LTD.

( * ) Notice: Subject to any disclaimer, the term of this patent is extended or adjusted under 35 U.S.C. 154(b) by 312 days.

(21) Appl. No.: 16/854,876

(22) Filed: Apr. 21, 2020

(65) Prior Publication Data
US 2020/0331396 A1 Oct. 22, 2020

(30) Foreign Application Priority Data

Apr. 22, 2019 (CN) .......................... 201910324704.7
Apr. 22, 2019 (CN) .......................... 201920553085.4

(51) Int. Cl.
*B60R 3/02* (2006.01)
*B60Q 1/32* (2006.01)

(52) U.S. Cl.
CPC ............... *B60R 3/02* (2013.01); *B60Q 1/323* (2013.01); *B60Q 2400/10* (2013.01)

(58) Field of Classification Search
CPC ............... B60Q 1/323; B60Q 2400/10; B60Q 2400/50; B60R 3/02
See application file for complete search history.

(56) References Cited

U.S. PATENT DOCUMENTS 10,539,285 B1 * 1/2020 Johnson ................. G02B 6/001
10,576,879 B1 * 3/2020 Salter .................... B60Q 1/0017

* cited by examiner

*Primary Examiner* — Jason M Han
(74) *Attorney, Agent, or Firm* — Perkins Coie LLP (57) ABSTRACT

The present disclosure provides a foot step for a vehicle and a vehicle. The foot step includes: a step body and a light unit. The light unit is disposed on the step body and at least includes a warning light group. The warning light group is configured to emit light to warn traffic participants nearby of a width and an expected driving route of the vehicle.

20 Claims, 6 Drawing Sheets

FOOT STEP FOR VEHICLE AND VEHICLE

CROSS-REFERENCE TO RELATED APPLICATIONS

This application claims priority to and benefits of Chinese Patent Application Serial Nos. 201910324704.7 and 201920553085.4, each filed with National Intellectual Property Administration of the People's Republic of China (PRC) on Apr. 22, 2019, the entire contents of which are incorporated herein by reference.

TECHNICAL FIELD

The present disclosure relates to the field of vehicle technologies, and particularly to a foot step for a vehicle.

BACKGROUND

A conventional foot step for a vehicle generally does not have a decorative light bar, thus causing a poor appearance of the foot step. Even if some foot steps for the vehicle are provided with the decorative light bar, the decorative light bar only plays a decorative role and has a poor cost-effectiveness.

SUMMARY

A foot step for a vehicle according to embodiments of a first aspect of the present disclosure includes a step body and a light unit. The light unit is disposed on the step body and at least includes a warning light group. The warning light group is configured to emit light to warn nearby traffic participants of a width and an expected driving route of the vehicle.

A vehicle according to embodiments of a second aspect of the present disclosure includes a foot step for a vehicle. The foot step for the vehicle includes a step body and a light unit. The light unit is disposed on the step body and at least includes a warning light group. The warning light group is configured to emit light to warn nearby traffic participants of a width and an expected driving route of the vehicle.

Additional aspects and advantages of embodiments of the present disclosure will be given in the following description, some of which will become apparent from the following description or be learned from practices of the present application.

BRIEF DESCRIPTION OF THE DRAWINGS

The above and/or additional aspects and advantages of the present application will become apparent and easy to understand from descriptions of the embodiments with reference to the drawings.

DETAILED DESCRIPTION

Embodiments of the present disclosure are further described with reference to the accompanying drawings. Same or similar reference signs represent the same or similar components or components that have the same or similar functions from beginning to end. The embodiments described below with reference to the accompanying drawings are exemplary, are merely used to explain the present disclosure, and cannot be construed as a limitation to the present disclosure.

A foot step 100 according to embodiments of the present disclosure is described below with reference to FIGS. 1-6.

Figure 1:
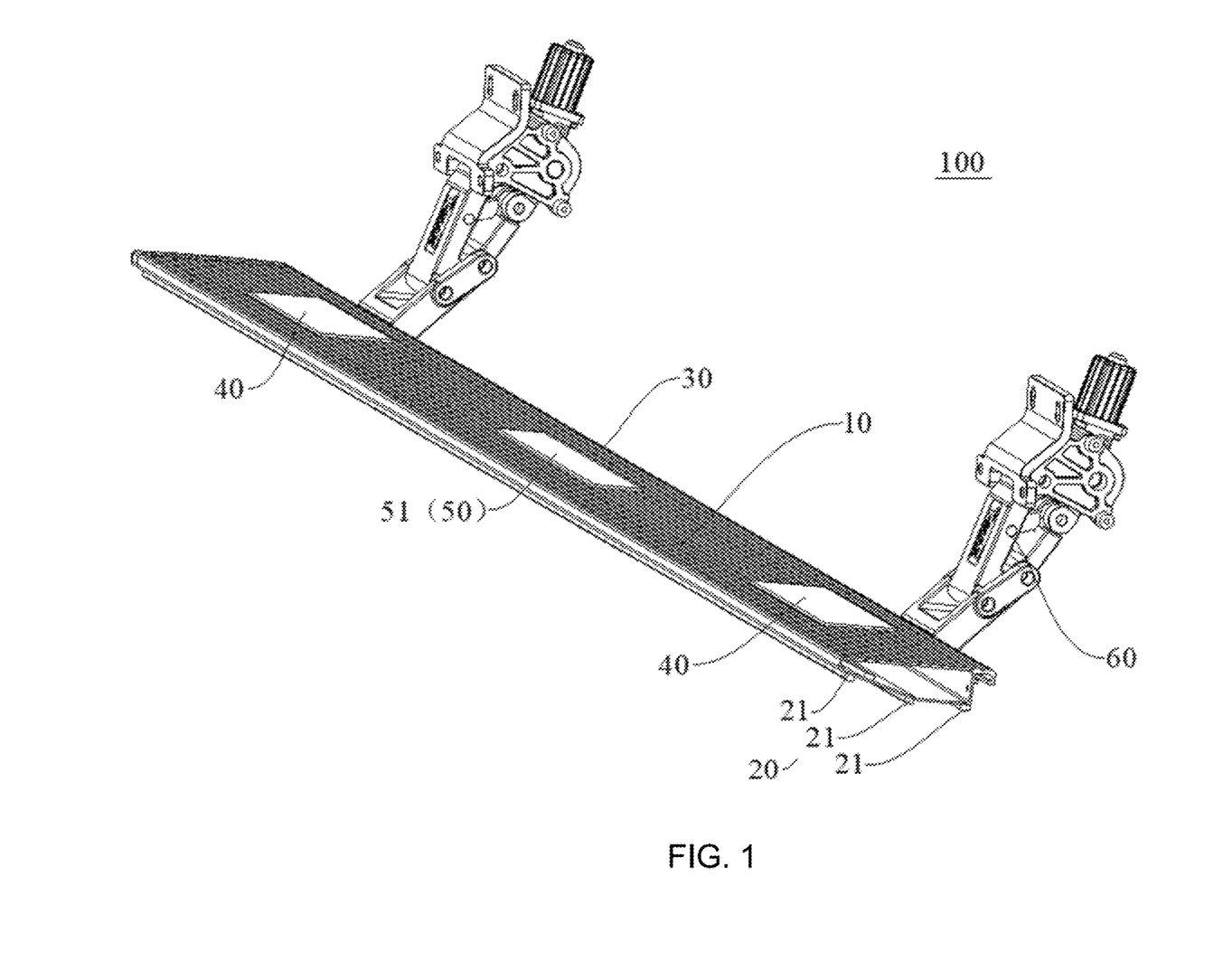
FIG. 1 shows a schematic view of a foot step according to example embodiments of the present disclosure from a perspective.
Figure 2:
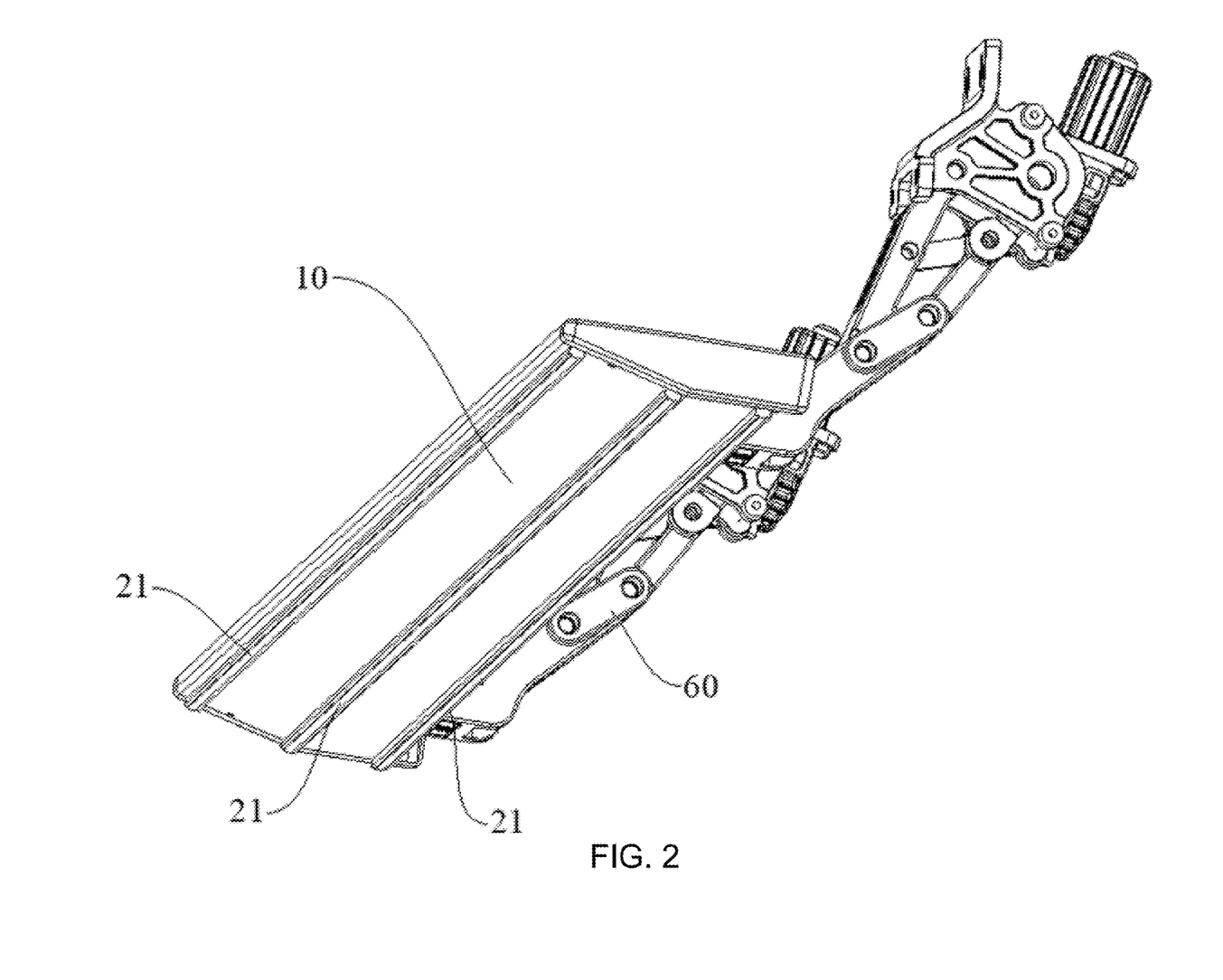
FIG. 2 shows a schematic view of a foot step according to example embodiments of the present disclosure from another perspective.
Figure 3:
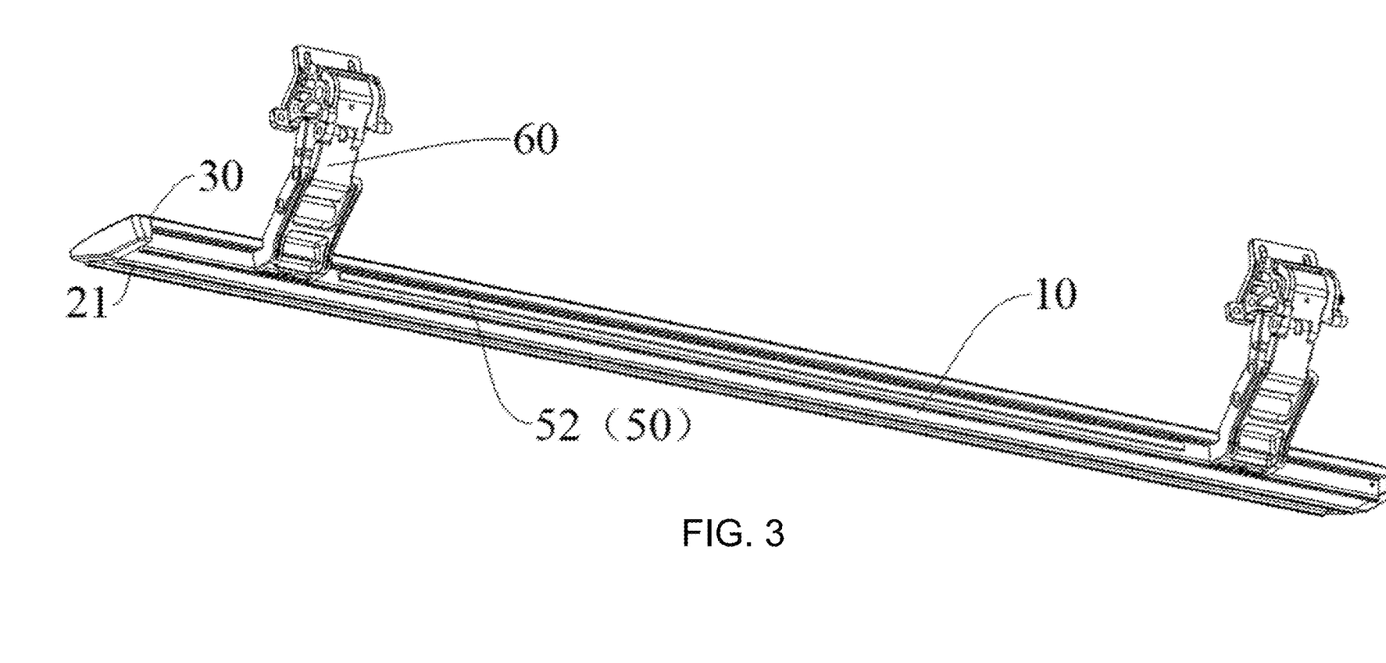
FIG. 3 shows a schematic view of a foot step according to example embodiments of the present disclosure from yet another perspective.

As illustrated in FIGS. 1-3, according to embodiments of a first aspect of the present disclosure, the foot step 100 for a vehicle 1000 includes a step body 10 and a light unit. The light unit is arranged on the step body 10, and at least includes a warning light group 20. The warning light group 20 is configured to emit light and project the light on the ground to form an identification which warns nearby traffic participants of a width and an expected driving route of the vehicle 1000 in the embodiment.

In the foot step 100 according to embodiments of the present disclosure, the light unit is provided on the step body 10, and during the use of the vehicle 1000 (e.g., during the driving and the roadside parking and/or waiting), the warning light group 200 projects the light to the ground, so as to provide information to the traffic participants through the projection and warn those traffic participants (e.g., the vehicles and the pedestrians nearby) of the expected driving route of the vehicle 1000 in the embodiment, thus achieving the purpose of safe driving, improving the safety of using the vehicle 1000, and also allowing the appearance of the vehicle 1000 to be aesthetic.

Figure 5:
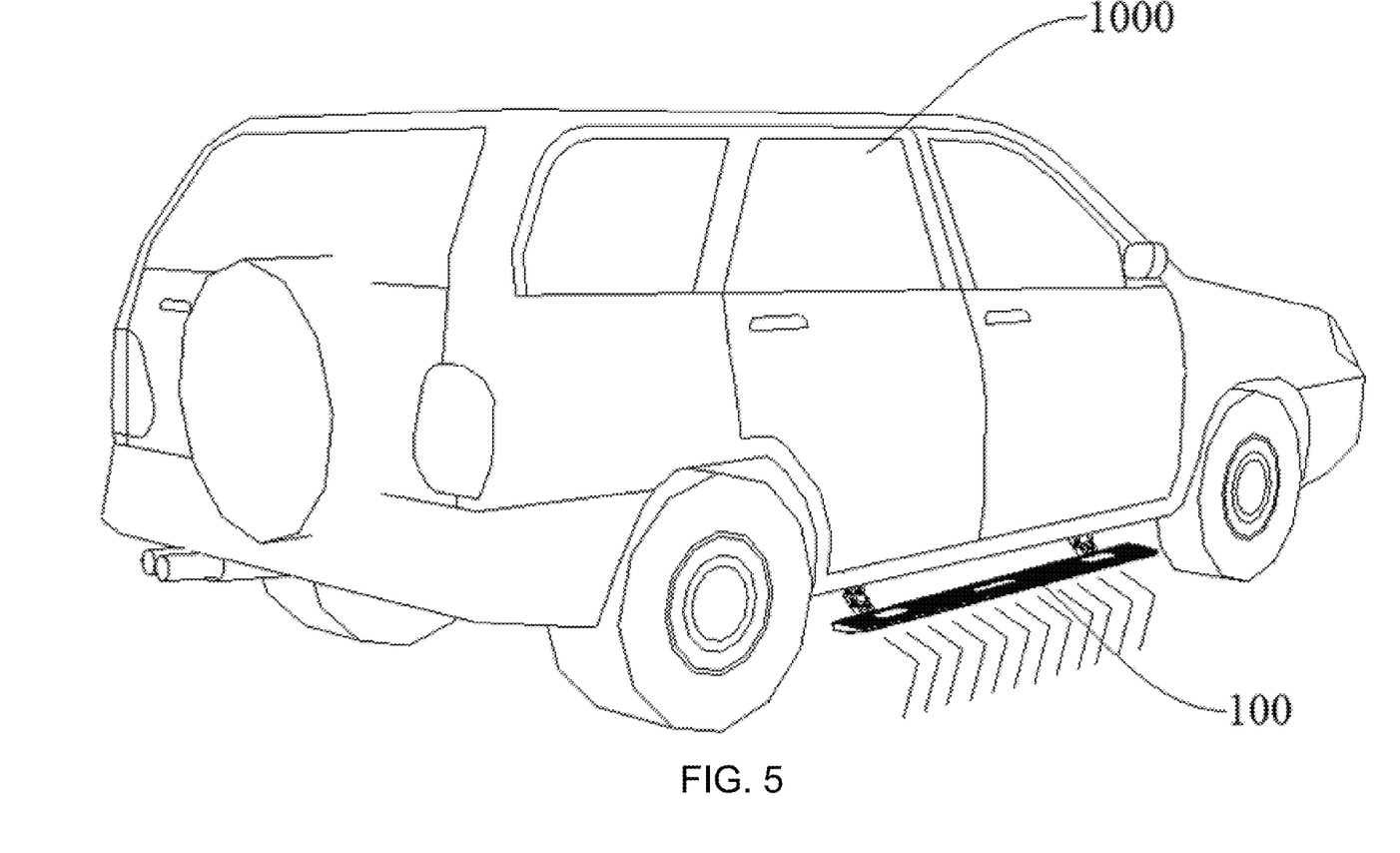
FIG. 5 shows a schematic view of a vehicle according to an example embodiment of the present disclosure from another perspective.
Figure 6:
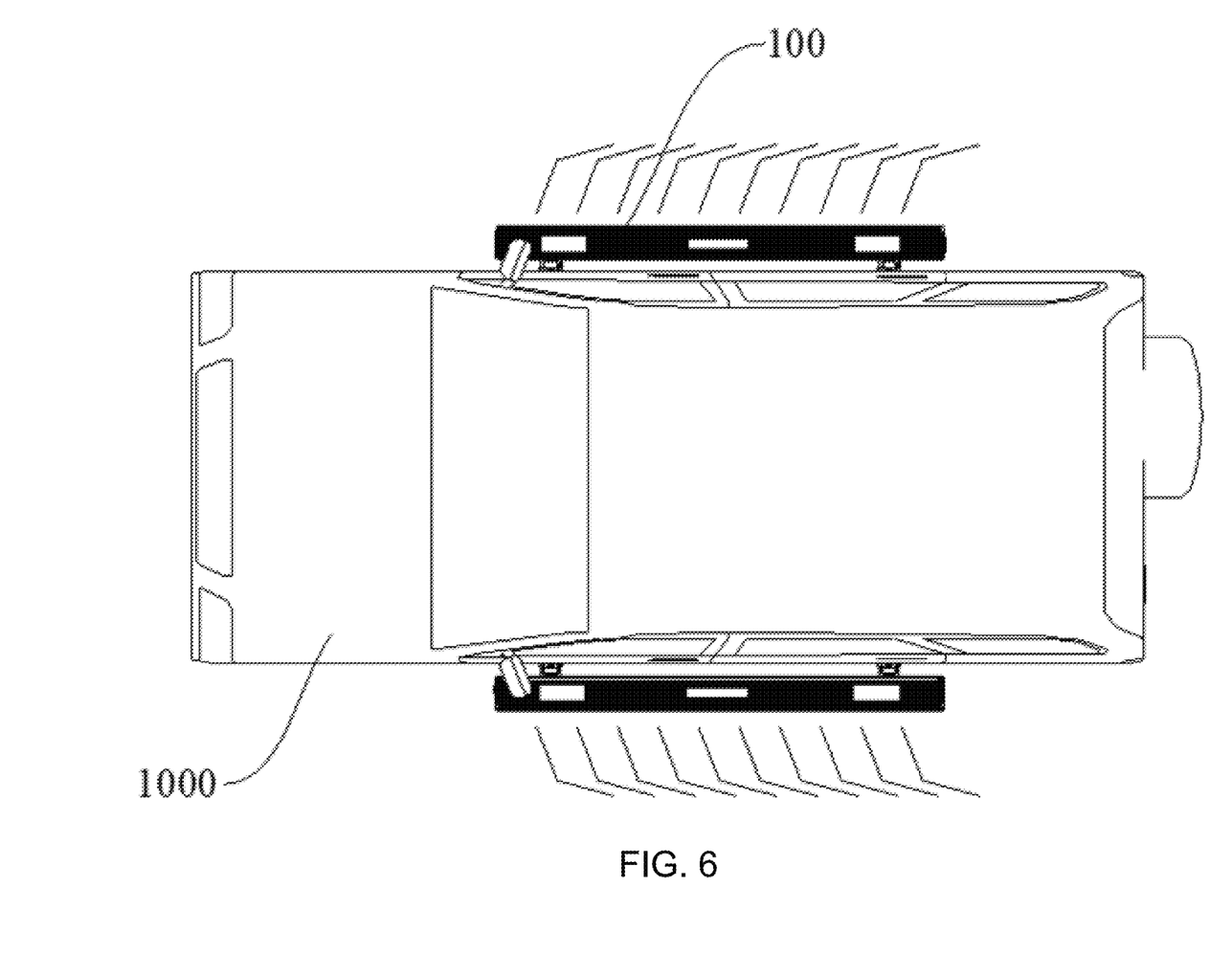
FIG. 6 shows a schematic view of a vehicle according to an example embodiment of the present disclosure from yet another perspective.

As illustrated in FIGS. 5-6, it should be noted that the expected driving route of the vehicle 1000 includes: deceleration driving, acceleration driving, left turning, right turning, parking, etc., and the warning light group 20 can project different light projections to the ground correspondingly.

In a specific embodiment illustrated in FIG. 1, the warning light group 20 is arranged on a lower side surface and/or an outer side surface of the step body 10. Specifically, in some embodiments, the warning light group 20 is arranged on the lower side surface of the step body 10, and in some other embodiments, the warning light group 20 is arranged on the outer side surface of the step body 10. In yet other embodiments, the warning light group 20 is arranged on both the lower side surface and the outer side surface of the step body 10.

In this way, since the warning light group 20 is arranged on the step body 10, the projection on the ground can be realized, while the light of at least part of the warning light group 20 is visible on the left and right sides of the vehicle 1000. Thus, even if the traffic participants have not observed the ground, they can still determine the expected driving route of the vehicle 1000 and the width of the vehicle 1000 through the light emitted from an outer side of the foot step 100, thereby further improving the working stability of the warning light group 20.

As illustrated in FIG. 1 and FIG. 2, the warning light group 20 includes at least two strip-shaped light bars 21, which may selectively emit light in monochrome or multi-color gradient to warn the traffic participants of the width of the vehicle 1000 or the expected driving route of the vehicle 1000 correspondingly. In other words, each strip-shaped light bar 21 may emit light in monochrome or multicolor, such that the at least two strip-shaped light bars 21 may cooperate with each other to make a projection and form different identifications on the ground.

Of course, the functions of the warning light group 20 in the embodiment of the present disclosure are not limited to this, and the warning light group 20 in the embodiment is further configured to improve the driving atmosphere. For example, the strip-shaped light bars 21 are not only suitable for forming an arrow warning on the ground to warn the traffic participants of the turning of the vehicle, but also may be configured as a marquee or a flowing water light to improve the driving atmosphere. In this way, on the premise that the warning light group 20 has a function of warning to improve the safety driving of the vehicle 1000, the warning light group 20 further has a function of improving the driving atmosphere, thus leading to a cool and aesthetic overall appearance of the vehicle 1000.

Moreover, it may be understood that the user may also adjust the frequency and the color sequence of the warning light group 20 based on their needs, when the warning light group 20 displays in a manner of the flowing water light or the marquee, so as to further improve the user experience.

As illustrated in FIG. 1 and FIG. 3, the light unit may further include an illuminating light group 30 configured to provide illumination, where the illuminating light group 30 is arranged on an end of an upper surface of the step body 10 facing an inner side surface of the step body 10. In this way, when a passenger gets on or off the vehicle, an area between a door of the vehicle 1000 and the step body 10 can be illuminated by the illuminating light group 30, so as to facilitate the passenger to get on or off the vehicle and protect the passenger from falling off when getting on or off the vehicle.

It may be understood that the step body 10 has an extended state which facilitates the passenger to get on the vehicle and a retracted state after the door is closed. The illuminating light group 30 includes at least one high-brightness light bar which is suitable for emitting light when the step body 10 is in the extended state. That is to say, only when the passenger gets on or off the vehicle, the illuminating light group 30 will light up, so as to reduce the energy consumption of the light unit on the premise of facilitating the passenger to get on or off the vehicle.

In some embodiments, the foot step 100 is an electric foot step, and the step body 10 is electrically driven to switch between the extended state and the retracted state.

As illustrated in FIG. 1 and FIG. 3, the light unit may further include an auxiliary light group 40 arranged on the upper surface of the step body 10. A plurality of the auxiliary light groups 40 are provided and each auxiliary light group 40 is arranged corresponding to one door of the vehicle 1000, respectively.

Specifically, the step body 10 of the vehicle 1000 may be provided with a weight sensor, a passenger identification sensor, and so on. Thus, the weight sensor collects a weight of the passenger and records the weight through an on-board electronic control unit (ECU). The passenger identification sensor senses whether the passenger that steps on the step body 10 is the passenger recorded by the on-board ECU, and then compares the data measured by the weight sensor at this time with the data recorded in the on-board ECU. When the weight of the passenger changes relatively greatly, a warning is generated by the auxiliary light group 40.

That is to say, the auxiliary light group 40 may selectively emit light of at least two colors to indicate the weight change of the passenger.

In this way, with the auxiliary light group 40, a warning can be generated when the weight of the passenger changes significantly, which is helpful for the passenger to pay attention to his/her health status.

Figure 4:
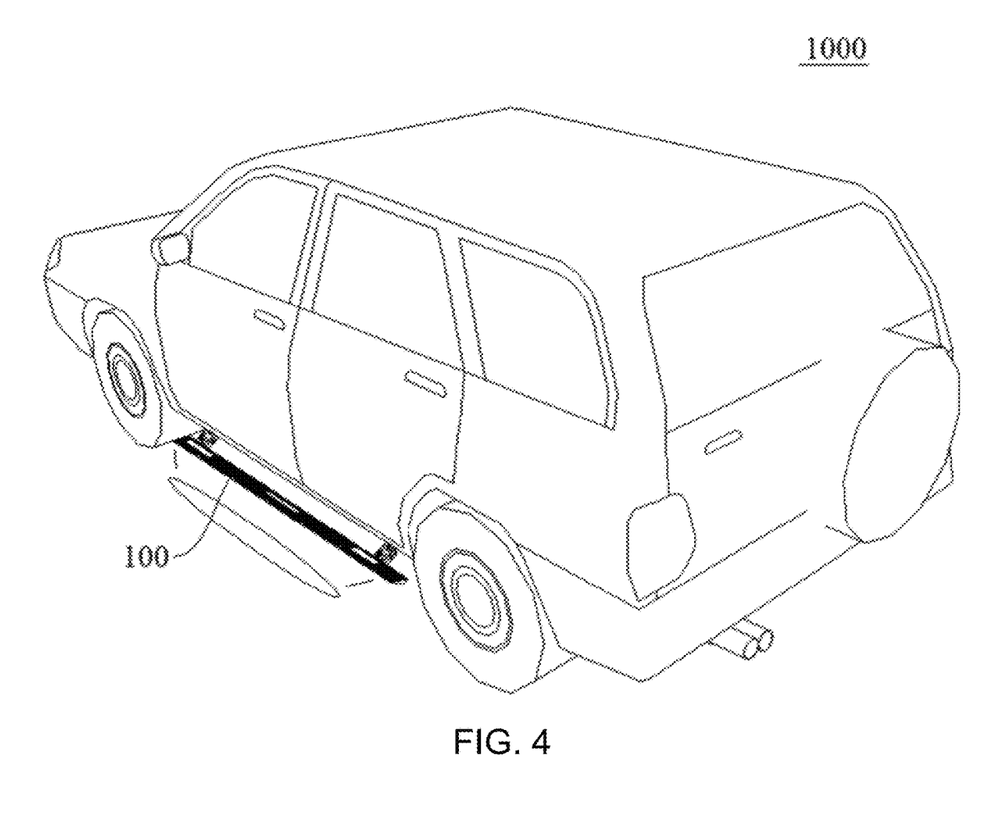
FIG. 4 shows a schematic view of a vehicle according to an example embodiment of the present disclosure from a perspective.

As illustrated in FIG. 1 and FIG. 3 and FIG. 4, the light unit may further include an atmosphere light group 50, which includes a logo light 51 arranged on the upper surface of the step body 10 and an atmosphere light 52 arranged on the inner side surface of the step body 10 (shown in FIG. 3). In this way, not only the aesthetics of the vehicle 1000 can be improved, but also the driving atmosphere can be heightened, so as to improve the driving experience.

It may be understood that, in some embodiments, the foot step 100 is fixed to a vehicle body through a bracket 60, and in other embodiments, the foot step 100 is integrated with a bottom-edge beam of the vehicle body.

The vehicle 1000 according to a second aspect of embodiments of the present disclosure includes a foot step 100 for the vehicle 1000 according to the above embodiments.

The technical effects of the vehicle 1000 according to the embodiments of the present disclosure are the same with those of the above foot step 100, and thus will not be described further herein.

In the description of the present disclosure, it is to be understood that the orientations or the position relationships indicated by terms such as "central," "longitudinal," "lateral," "length," "width," "thickness," "up," "down," "front," "rear," "left," "right," "vertical," "horizontal," "top," "bottom," "inner," "outer," "clockwise," "counterclockwise", "axial" "radial" and "circumferential" indicate are the orientations or the position relationships illustrated in the drawings, only intended for convenient descriptions of the present disclosure and also for simplifying the description, and do not indicate or imply that the device or element referred to must have a particular orientation or be constructed and operated in a specific orientation, and hence cannot be construed as a limitation to the present disclosure.

In the description of the present disclosure, "a first feature", "a second feature" may include one or more of this feature.

In the description of the present disclosure, "a plurality of" means two or more than two.

In the description of the present disclosure, the first features is "above" or "below" the second feature may be that the first feature is in direct contact with the second feature, or that the first feature is not in direct contact with the second feature, but via another feature therebetween.

In the descriptions of the present disclosure, the first feature "up", "above" and "on" the second feature may be that the first feature is directly above or obliquely above the second feature, or merely be that the first feature has a level higher than the second feature.

In the descriptions of the present disclosure, terms such as "an embodiment," "some embodiments," "an exemplary embodiment", "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example.

Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations can be made in the embodiments without departing from principles and purposes of the present disclosure.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements, and variations can be made based on what is described and illustrated in this patent document.

What is claimed is:

1. A foot step for a vehicle, comprising:
   a step body; and
   a light unit disposed on the step body and comprising a warning light group, the warning light group configured to emit light to warn traffic participants nearby of a width and an expected driving route of the vehicle,
   wherein the light unit further comprises a plurality of auxiliary light groups disposed on an upper surface of the step body, each of the plurality of auxiliary light groups is arranged corresponding to one door of the vehicle, respectively,
   wherein the plurality of auxiliary light groups is configured to selectively emit light of at least two colors to indicate a weight change of a passenger.

2. The foot step for the vehicle according to claim 1, wherein the warning light group is configured to project the light on the ground to form an identification which warns the traffic participants nearby of the width and the expected driving route of the vehicle.

3. The foot step for the vehicle according to claim 1, wherein the warning light group is disposed on a lower side surface or an outer side surface of the step body.

4. The foot step for the vehicle according to claim 3, wherein the warning light group comprises at least two strip-shaped light bars, and the at least two strip-shaped light bars are configured to selectively emit light in monochrome or multicolor gradient to warn the traffic participants of the width of the vehicle or the expected driving route of the vehicle correspondingly.

5. The foot step for the vehicle according to claim 4, wherein the at least two strip-shaped light bars are configured to form an arrow warning on the ground to warn the traffic participants of a turning of the vehicle, or are configured as a marquee or a flowing water light to improve a driving atmosphere.

6. The foot step for the vehicle according to claim 1, wherein the light unit further comprises an illuminating light group configured to provide illumination, and the illuminating light group is disposed on an end of an upper surface of the step body facing an inner side surface of the step body.

7. The foot step for the vehicle according to claim 6, wherein the step body has an extended state to facilitate a passenger to get on the vehicle and a retracted state after a door of the vehicle is closed, and the illuminating light group comprises at least one high-brightness light bar configured to emit light when the step body is in the extended state.

8. The foot step for the vehicle according to claim 7, wherein the foot step is an electric foot step, and the step body is electrically driven to switch between the extended state and the retracted state.

9. The foot step for the vehicle according to claim 1, wherein the light unit further comprises an atmosphere light group, and the atmosphere light group comprises a logo light disposed on an upper surface of the step body and an atmosphere light disposed on an inner side surface of the step body.

10. A vehicle, comprising a foot step, wherein the foot step comprises:
    a step body;
    a light unit disposed on the step body and comprising a warning light group, the warning light group configured to emit light to warn traffic participants nearby of a width and an expected driving route of the vehicle,
    wherein the light unit further comprises a plurality of auxiliary light groups disposed on an upper surface of the step body, each of the plurality of auxiliary light groups is arranged corresponding to one door of the vehicle, respectively,
    wherein the plurality of auxiliary light groups is configured to selectively emit light of at least two colors to indicate a weight change of a passenger.

11. The vehicle according to claim 10, wherein the warning light group is configured to project the light on the ground to form an identification which warns the traffic participants nearby of the width and the expected driving route of the vehicle.

12. The vehicle according to claim 10, wherein the warning light group is disposed on a lower side surface or an outer side surface of the step body.

13. The vehicle according to claim 12, wherein the warning light group comprises at least two strip-shaped light bars, and the at least two strip-shaped light bars are configured to selectively emit light in monochrome or multicolor gradient to warn the traffic participants of the width of the vehicle or the expected driving route of the vehicle correspondingly.

14. The vehicle according to claim 13, wherein the at least two strip-shaped light bars are configured to form an arrow warning on the ground to warn the traffic participants of a turning of the vehicle, or are configured as a marquee or a flowing water light to improve a driving atmosphere.

15. The vehicle according to claim 10, wherein the light unit further comprises an illuminating light group configured to provide illumination, and the illuminating light group is disposed on an end of an upper surface of the step body facing an inner side surface of the step body.

16. The vehicle according to claim 15,
wherein the step body has an extended state to facilitate a passenger to get on the vehicle and a retracted state after a door of the vehicle is closed, and the illuminating light group comprises at least one high-brightness light bar configured to emit light when the step body is in the extended state,
wherein the foot step is an electric foot step, and the step body is electrically driven to switch between the extended state and the retracted state.

17. A foot step for a vehicle, comprising:
a step body; and
a light unit disposed on the step body and comprising an auxiliary light group disposed on an upper surface of the step body, wherein the auxiliary light group is arranged corresponding to a door of the vehicle,
wherein the auxiliary light group is configured to selectively emit light of at least two colors to indicate a weight change on the step body associated with a presence of a passenger.

18. The foot step according to claim 17, wherein the light unit further comprises an atmosphere light group including a logo light disposed on the upper surface of the step body and an atmosphere light disposed on an inner side surface of the step body.

19. The foot step according to claim 17, wherein the light unit further comprises a warning light group configured to emit light to warn traffic participants nearby of a width and an expected driving route of the vehicle, wherein the warning light group is disposed on a lower side surface or an outer side surface of the step body.

20. The foot step according to claim 19, wherein the light unit further comprises an illuminating light group configured to provide illumination and disposed on an end of the upper surface of the step body facing an inner side surface of the step body.

* * * * *